June 14, 1938. H. D. GEYER 2,120,701
FREEZING TRAY
Filed Dec. 17, 1937 2 Sheets-Sheet 2
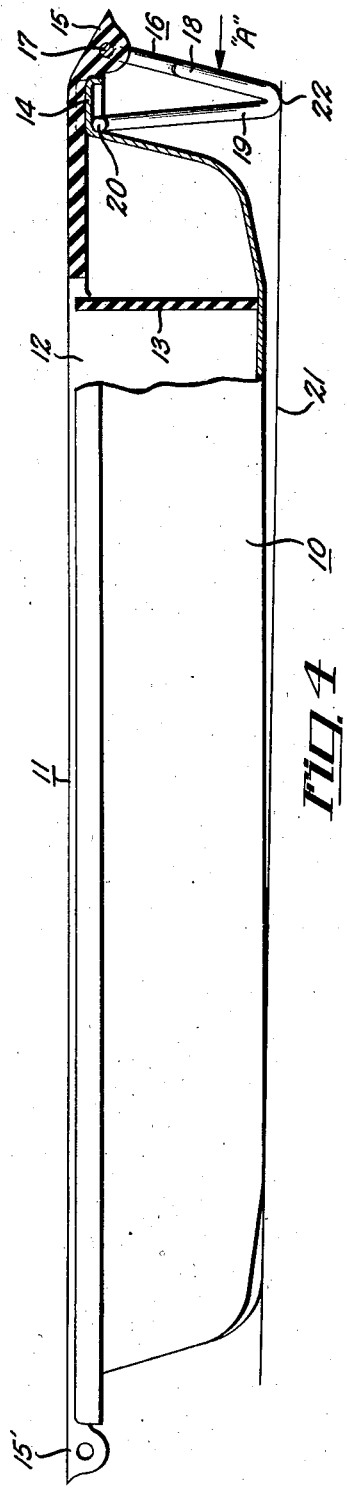
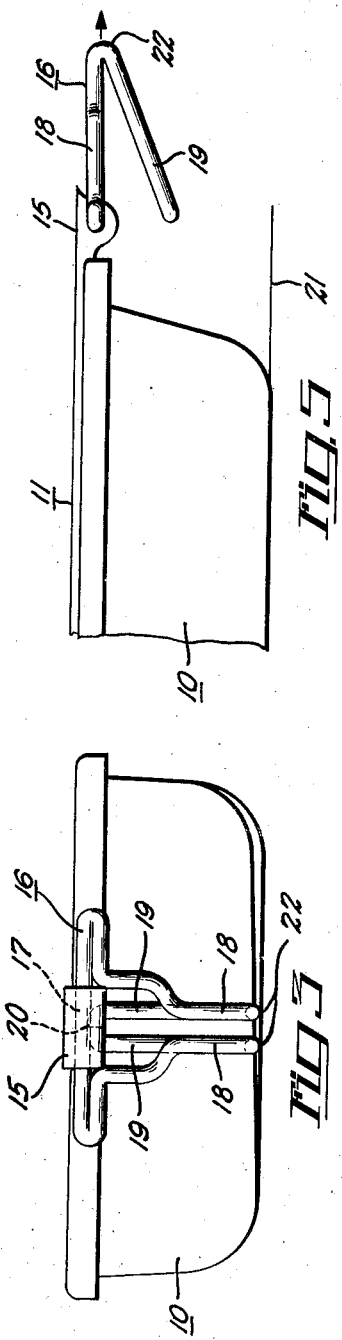
INVENTOR
Harvey D. Geyer
BY Spencer Hardman & Fehr
his ATTORNEYS Patented June 14, 1938

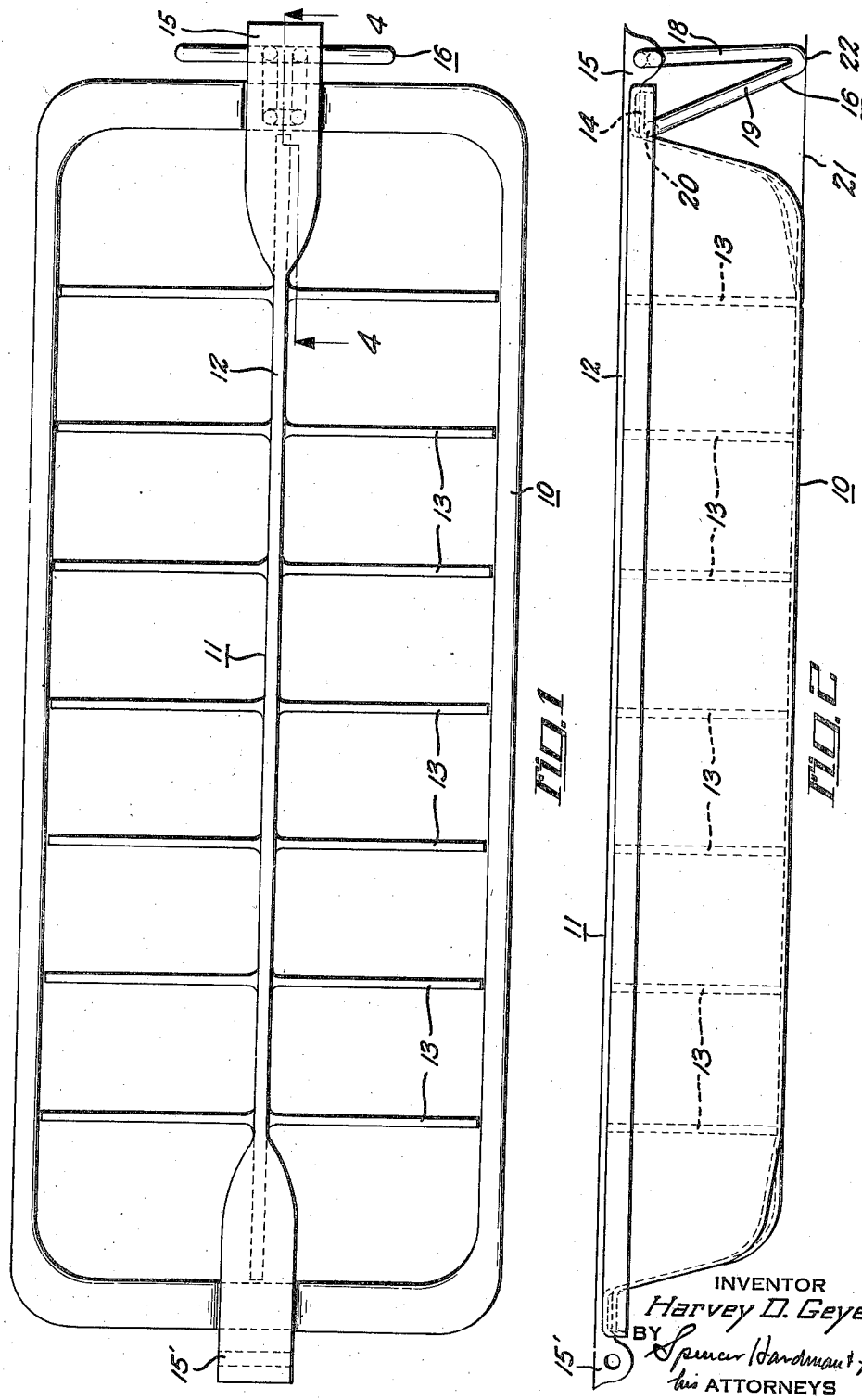

2,120,701

UNITED STATES PATENT OFFICE 2,120,701

FREEZING TRAY

Harvey D. Geyer, Dayton, Ohio, assignor to General Motors Corporation, Detroit, Mich., a corporation of Delaware Application December 17, 1937, Serial No. 180,273

6 Claims. (Cl. 62—108.5)

This invention relates to freezing trays such as are adapted for use in household refrigerators.

An object of this invention is to provide a very simple and efficient force-multiplying means for breaking the container pan loose from the surface upon which it rests during freezing and to which it ordinarily becomes bonded by a film of ice.

Various ice-pan lifting devices have been heretofore devised, however such prior devices have been usually mounted upon the container pan itself and with a consequent complicated structure and expense in making the pan. Hence an object of this invention is to provide an ice-pan lifting device which is mounted upon a removable grid structure rather than upon the pan structure, and is thus readily entirely separated from the pan at will and will require no complications in the pan structure. No attachment brackets or lugs are required on the pan, hence the pan may be a simple one-piece drawn metal pan having a simple outward flange at the end thereof to receive the lifting force of the lifting device.

Another advantage of the lifting device of this invention results from the fact that it is a unitary part of the grid rather than of the pan, and hence may be sold with most any improved form of grid as an accessory for use with various well-known forms of pan now on the market. In other words, an improved type of grid with the lifting device of this invention mounted thereon may be bought by a consumer and used with the pan he may already have, thus saving considerable expense.

Another feature of the device of this invention is its simplicity and small cost of manufacture, and its efficiency in operation.

Further objects and advantages of the present invention will be apparent from the following description, reference being had to the accompanying drawings wherein a preferred embodiment of the present invention is clearly shown.

In the drawings:

Fig. 1 is a plan view of an ice tray having the pan-lifting device of this invention applied thereto.

Fig. 2 is a side elevation of Fig. 1, showing the lifting device in its normal position during freezing.

Fig. 3 is an end view of Fig. 2.

Fig. 4 is a side view of the tray, showing the front end of the tray lifted from its supporting surface by actuation of the lifting device of this invention.

Fig. 5 illustrates how the lifting device may be used as a handle to pull the tray from its freezing compartment in the refrigerator.

Similar reference characters refer to similar parts thruout the several views.

For the purposes of illustration, the drawings disclose a drawn metal pan 10 and a removable integral flexible rubber grid 11 having a central longitudinal partition 12 and transverse partitions 13. The central partition 12 has an integral flexible rubber projection 15 of any desired width and which projects somewhat beyond the end of the metal pan 10. The pan-lifting member 16 is mounted upon this flexible projection 15 and depends therefrom outside of pan 10.

This lifting member 16 is illustrated as formed from a continuous quite rigid round metal wire, preferably non-corrosive or plated steel wire. Its upper horizontal bar 17 extends thru an aperture in the rubber projection 15 and is thus hingedly mounted thereupon. The wire is bent (as more clearly shown in Fig. 3) to form two double legs 18 and 19. The upper ends of the two legs 19 are turned toward and abut each other at 20 (Fig. 3). The wire may be assembled to projection 15 by being only partially formed prior to threading it thru the hole in the flexible rubber member 15 which is sufficiently elastic to pass around the various turns in the wire. The length of the two legs 19 is greater than the vertical height of pan 10 from the under side of flange 14 thereof to the pan-supporting surface 21. Hence when the upper ends 20 of legs 19 abut the under side of flange 14 (as shown in Fig. 2) the legs 19 will be inclined from the vertical and their lower rounded ends 22 will rest loosely upon the pan-supporting surface 21. When legs 19 are in this position of Fig. 2 the legs 18 are preferably substantially vertical.

Now when legs 18 are pressed inwardly by hand as shown by arrow "A" in Fig. 4, the rounded ends 22 of the legs will slide upon surface 21 and move legs 19 to a more nearly vertical position and thereby cause a greatly multiplied force to lift pan 10 from its supporting surface 21. Thus a quite small force "A" will be sufficient to break the frozen bond between the pan 10 and its supporting surface 21. When legs 18 and 19 are moved to the position shown in Fig. 4 the pivot bar 17 must move downward slightly to accommodate this movement of legs 18 and 19. This slight down movement of bar 17 is readily permitted by the downward flexure of the rubber projection 15, as shown in Fig. 4. Obviously a swinging or flexing metal link can be readily substituted for the flexible projection 15 in any desired embodiment of the pan-lifter invention, that is, in any embodiment where a metal grid is used rather than a flexible rubber grid. In other words, this pan-lifter device is obviously readily applicable to freezing grids made of metal as well as of rubber, since it is necessary only that the pivot support of the upper end of legs 18 be permitted to move down slightly during the pan-lifting operation illustrated in Fig. 4.

After pan 10 is loosened from its support as above described, the lifting member 16 may be used bodily as a handle with which to pull the entire tray and contents from its freezing compartment. When so doing the lifter member 16 may be swung to the position shown in Fig. 5, thus forming a very convenient hand grasp.

It is obvious that many variations may be made from the above-described form of lifter member 16 without departing from the teachings of this invention. For instance, lifter 16 may be a sheet metal stamping, or a cast metal part, and need not have distinct and separate legs such as legs 18 and 19; only one inclined strut (which is equivalent to leg 19) is necessary provided it be supported in a manner equivalent to that described above, or in such manner as to function as above described.

Grid 11 has been shown with a flexible projection 15' at its opposite end, which is similar to projection 15 to which lifter member 16 is attached. Obviously a lifter member 16 could be applied to both ends of the grid if so desired, in order to avoid all possibility of inadvertently putting the ice tray into its freezing compartment backwards.

While the embodiment of the present invention as herein disclosed, constitutes a preferred form or forms, it is to be understood that other forms might be adopted, all coming within the scope of the claims which follow.

What is claimed is as follows:

1. In a freezing tray, in combination, a container pan, a grid within said pen, and a depending strut member attached to said grid and located outside of said pan, said strut member having one portion thereof adapted to engage the support upon which the pan rests and another portion thereof adapted to engage the pan for loosening said pan from its frozen bond to the support.

2. In a freezing tray, in combination, a container pan, a grid within said pan, and a depending strut member mounted upon said grid and located outside of said pan, said strut member having a vertically inclined portion engageable with the pan and the pan-supporting surface and movable to a more upright position to lift said pan from its supporting surface.

3. In a freezing tray, in combination, a container pan, a grid within said pan, and a depending strut member movably mounted upon said grid and depending outside of said pan, said member being engageable with the pan and the pan-supporting surface, and being actuatable to lift said pan from its supporting surface.

4. In a freezing tray, in combination, a container pan, a grid within said pan, a movable member attached to said grid and projecting beyond the end of said pan, and a tray-lifting member mounted upon a portion of said movable member and arranged to react upon the pan-supporting surface and operable to force said pan upwardly from its supporting surface.

5. In a freezing tray, in combination, a container pan, a grid within said pan, a tray-lifting member movably mounted upon said grid and depending outside of said pan, said tray-lifting member being operable to react upon the pan-supporting surface to force said pan upwardly from its supporting surface.

6. In a freezing tray, in combination, a container pan, a grid within said pan, a tray-lifting member attached to said grid and depending therefrom outside of said pan, said member being swingable by manual force to react upon the pan-supporting surface and to force the tray and its contents upwardly from its supporting surface.

HARVEY D. GEYER.